Feb. 15, 1966   J. C. McGREW   3,234,618
MACHINE FOR FORMING SHORT AND BEVELED CONDUIT SECTIONS
HAVING DOWEL PIN HOLES
Filed Oct. 21, 1963   4 Sheets-Sheet 1
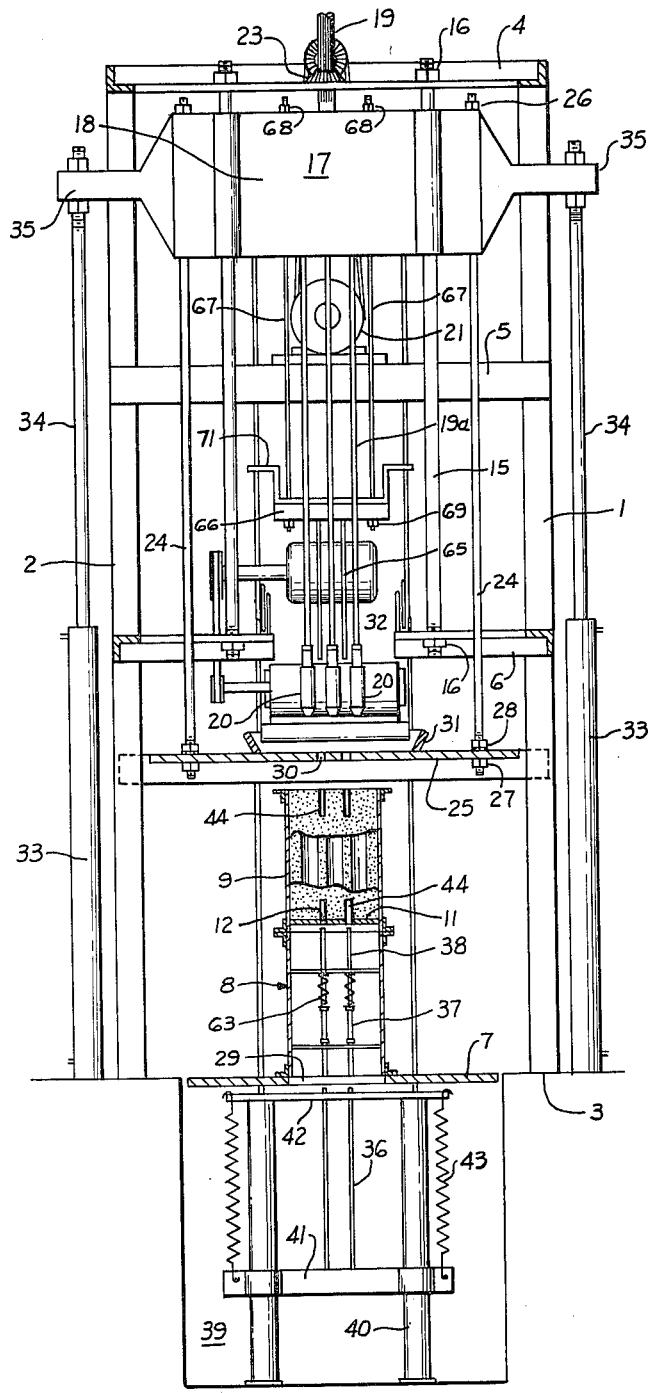
Fig-1
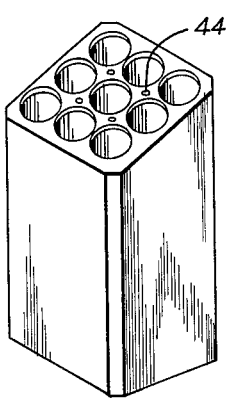
Fig-2
Fig-3
INVENTOR.
JAMES C. McGREW
BY Browning, Simms
Hyer, & Eickenroht
ATTORNEYS

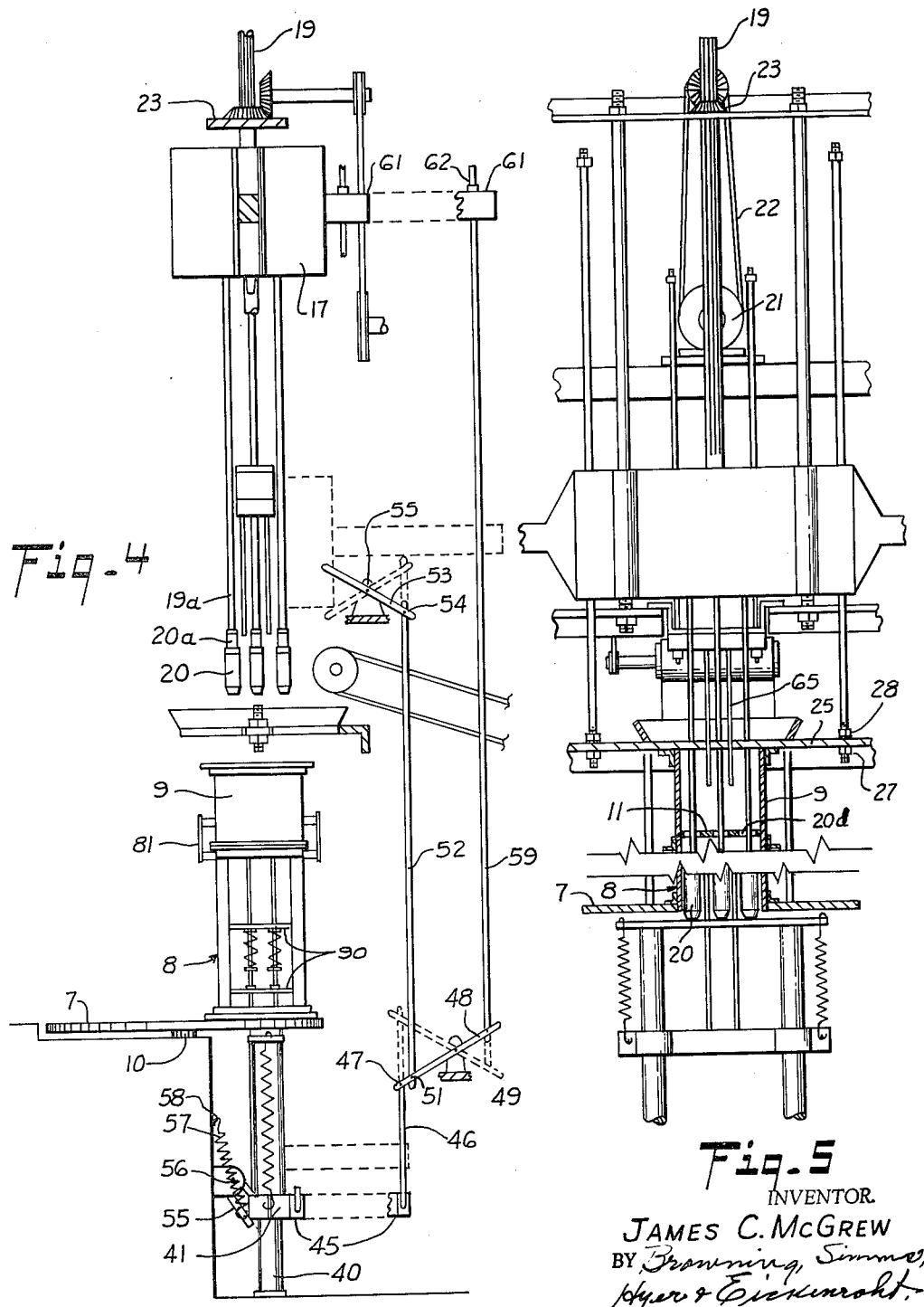

Feb. 15, 1966  J. C. McGREW  3,234,618
MACHINE FOR FORMING SHORT AND BEVELED CONDUIT SECTIONS
HAVING DOWEL PIN HOLES
Filed Oct. 21, 1963  4 Sheets-Sheet 3

INVENTOR.
JAMES C. McGREW
BY Browning, Simms,
Ayer & Eickenroht
ATTORNEYS

Feb. 15, 1966     J. C. McGREW     3,234,618
MACHINE FOR FORMING SHORT AND BEVELED CONDUIT SECTIONS
HAVING DOWEL PIN HOLES
Filed Oct. 21, 1963     4 Sheets-Sheet 4

INVENTOR.
JAMES C. McGREW
BY Browning, Simms,
Hyer & Eickenroht
ATTORNEYS

# United States Patent Office 3,234,618
Patented Feb. 15, 1966

3,234,618
MACHINE FOR FORMING SHORT AND BEVELED CONDUIT SECTIONS HAVING DOWEL PIN HOLES
James C. McGrew, Houston, Tex., assignor, by mesne assignments, of forty-four percent to Douglas N. Norton, twelve and one-half percent to Marion C. McKinley, seven and one-half percent to H. W. Lehman, two and one-half percent to Ruth J. Garnett, four percent to John W. Brandenberger, two and one-half percent to Ida Perkins, one percent to Vernon G. Stamm, one percent to Henry J. Denton, one percent to Browning & Simms, twenty-two percent to William F. Newton, one percent to W. R. Sellers and one percent to Glynn S. McClellan
Filed Oct. 21, 1963, Ser. No. 317,725
5 Claims. (Cl. 25—33)

This invention relates to machines for manufacturing multi-hole conduits such as the conduit utilized in laying underground communication cables or the like.

The present general practice in laying underground cable for communication lines is to run cables through buried conduit. Multi-cell or multi-duct conduit is utilized. Recently, a machine has been developed for manufacturing multi-hole conduit from concrete or the like which may be utilized in running cable and/or other purposes for which such conduit may be used. In that machine, a plurality of packer heads is employed corresponding in number to the number of ducts to be formed in the multi-duct conduit desired, each of these heads being somewhat similar to the single packer head previously used in fabricating single-bore concrete conduit. In a machine of this type, the rotating packer heads in effect provide the packing walls for each other; that is, one packer head in rotating packs against an adjacent packer head; and it is not necessary to have a wall of a mold surrounding each packer head. These packer heads are caused to travel endwise through a mold as the mold is filled with cement mix and cause packing of the mix around the packer heads, which in passing through the mold leave the desired ducts through the formed concrete behind them.

To provide means for aligning adjacent sections of the conduit, small dowel pin holes are formed in each end of each section of conduit. Such holes are useful in single duct conduit but the necessity for them is paramount in multi-duct conduit. In many previous machines, the means for forming holes for dowel pins has involved pins mounted on the end walls of a form used in forming the conduit. Then, when or after the end walls are removed from the formed conduit, the hole-forming pins are removed and the holes are left for the reception of dowel pins.

My co-pending application Serial No. 772,031, filed November 5, 1958, now Patent No. 3,106,005, is directed to a machine of the above general type having a dowel hole-forming mechanism which is automatically retracted and withdrawn from the formed conduit and form at the end of the forming operation, before removal of elements providing ends of the form, without opportunity for damage to the formed section and without the requirement of any arduous effort for removal of dowel hole-forming pins. This machine, however, is limited in operation to the formation of conduit sections of a single selected length and requires extensive reconstruction or interchange of parts when conduit sections are to be made of length differing from a selected standard length for which the machine is designed. It also is designed to form conduit sections having end surfaces normal to the longitudinal axis of the section. In laying conduit composed of such sections, it is often desirable to have sections of length shorter than a selected standard length so that conduits of a length which is not an exact multiple of the standard length can be easily assembled without the necessity for breaking or cutting an end conduit section to secure a fit. Concrete conduit sections are very difficult to break or cut to desired length since they tend to break or shatter to leave a very ragged or irregular end. Short length sections having their opposite ends beveled on planes extending outward radially from a common center also are desirable for making turns or bends in a conduit as it is laid.

It is, therefore, an object of this invention to provide a conduit-forming machine having retractable dowel hole-forming mechanism which can be easily and quickly converted to one suitable for forming conduit sections of shorter length than a selected standard length for which the machine was designed and which can form short length conduit sections having beveled ends suitable for laying arcuate portions of conduit.

Another object is to provide a machine of the above type which can be converted to form short or beveled conduit sections without extensive interchange of parts.

Another object is to provide such machine in which length of travel of packer heads and dowel hole-forming pins is not changed, and cooperative relationship of driving and driven parts is not changed when short sections are formed, and in which the conduit-forming operation, handling of materials and handling and curing the product are substantially unchanged in converting from standard length sections to shorter sections and vice versa.

Other objects and advantages of this invention will become apparent from the following description taken in connection with the attached drawings wherein is set forth by way of illustration and example one embodiment of this invention.

FIG. 1 is a view partly in front elevation and partly in longitudinal cross section illustrating a machine constructed in accordance with this invention, with the various parts in the position they occupy at the end of the forming operation.

FIG. 2 is a perspective of a multi-duct conduit section having dowel pin holes formed in its ends after the manner in which such holes are adapted to be formed by the present invention, and illustrating a dowel pin of the type adapted to be used in such holes.

FIG. 3 is a perspective of a multi-duct conduit section of shorter length than the section illustrated in FIG. 2 and having its ends beveled on planes extending radially outward from the common center and having dowel pin holes formed in its end as such holes are adapted to be formed by the present invention.

FIG. 4 is a view in side elevation illustrating the same machine as shown in FIG. 1.

FIG. 5 is a fragmentary view partly in front elevation and partly in longitudinal cross section and illustrating the same machine as shown in FIGS. 1 and 4 but with the parts including the dowel hole forming mechanism in the positions they occupy during the forming of the section of conduit.

Figure 7:
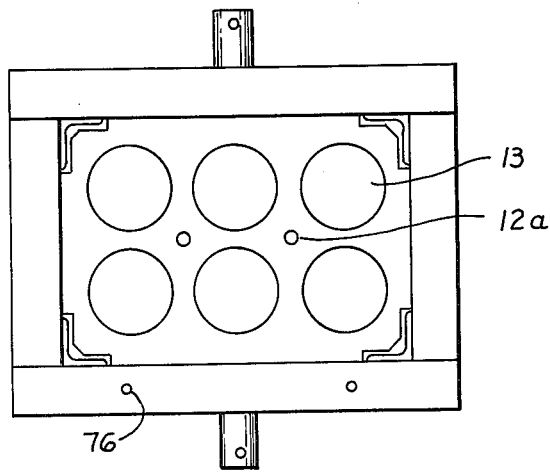
FIG. 7 is a plan view of the top of the stand of FIG. 6.
Figure 6:
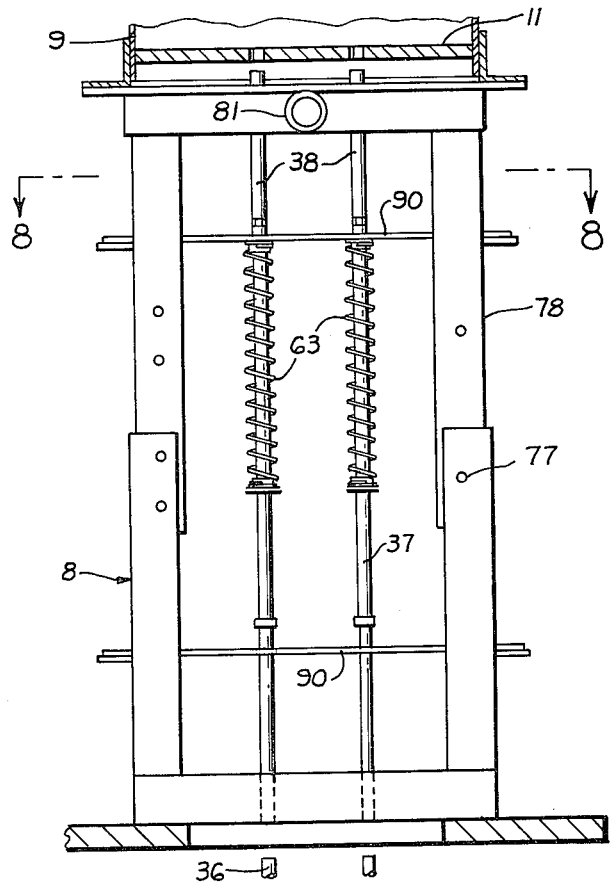
FIG. 6 is a front elevation of an adjustable stand for inserting between a form support and a form, showing the relationship of the stand to the form support, to the form, and the cooperative arrangement of dowel hole forming members of the stand and the dowel hole forming members of the machine used in forming dowel holes in sections of standard length.

The objects of the invention are accomplished by provision of means for forming the dowel pin holes comprising spring returned auxiliary push rods carrying dowel hole forming pins on their upper ends and having their lower ends in axial alignment with dowel hole forming pins normally used for forming dowel pin holes in sections of standard length. The auxiliary push rods are carried in a stand of adjustable height, which is removably carried upon the form supporting member of the machine in a position normally occupied by a form of standard length. Variable length of the push rods, according to the height of the adjustable stand, is provided by use of interchangeable rods, construction of the push rods with detachable sections corresponding to the various heights to which the stand may be adjusted, or by making the rods adjustable. A short form is supported upon the stand so that the height of the stand and form together are equivalent to the height of a form of standard length.

When the ends of the conduit section are to be beveled, a short form having beveled ends is used and one side of the form is supported on a propping member on the stand so that the form stands vertically. The stand may be equipped with a lifting member which extends upward along the outside of the short form for a distance sufficient that the center of gravity of the filled form and stand is below the upper end of the lifting member.

Referring in more detail to the drawings, the invention is illustrated in connection with a multi-duct conduit-forming machine constructed generally according to my co-pending application, Serial No. 772,031, filed November 5, 1958. This machine is generally carried by a suitable framework consisting of upright members 1 and 2 mounted on a suitable foundation 3 and having suitably located cross members 4 and 5 and a transverse support 6, which in the illustration is shown as interrupted adjacent the center portion thereof, so as to permit passage of the duct forming packer heads and their associated equipment, as well as that portion of the dowel pin hole-forming mechanism that forms dowel pin holes in the upper end of the concrete conduit section.

In the type of machine illustrated, a movable form support 7 is provided and a stand designated generally as 8 is carried by the form support. A form 9 of shorter length than a standard length form for which the machine was designed is carried upon stand 8. The platform or support preferably is made movable to facilitate the removal and placement of forms and stands and in the present case is illustrated in the form of a turntable mounted on a central pivot 10, shown in FIG. 4.

The form 9 is provided with a removable bottom or pallet 11. The pallet 11 is provided with openings which are of diameter substantially the same as the diameter of the ducts to be formed in the finished conduit section. The purpose of these openings will be explained later.

The pallets 11 also are provided with openings 12 of a size and in positions corresponding to the positions in which it is desired that dowel pin holes be formed in the lower end of the finished conduit. The stand 8 has openings 12a in the top thereof corresponding in position to the openings 12 in the pallets and also has openings 13 in position to permit the later described packer heads to pass through. A passageway for the packer heads is thus provided entirely through the short form, pallet, stand and the supporting table 7 which has an opening 29 approximately the size of and registering with the interior of stand 8.

The frame is provided with a guide in the form of upright bars 15 secured at their opposite ends by nuts 16, or the like, to cross member 4 at their upper ends and to the support member 6 at their lower ends. Slidably mounted on this guide is a slide 17 in which is carried a gearbox 18 for converting the drive from a drive shaft 19 into rotation of the various packer heads carrying drive shafts 19a. These drive shafts 19a extend downward from the gearbox 18. The packer head drive shafts carry packer heads 20 of suitable type on their lower ends. The details of these packer heads form no part of the present invention, but ordinarily packer heads have upper packer portions and lower troweling portions. The drive shaft 19 is movable up and downward and is adapted to be rotated by any suitable driving means, such as motor 21, the belt 22 and a beveled gear 23 having splines therein adapted to receive the splined upper end of the drive shaft 19.

Suspended from the slide 17 by means of suspension rods 24 is a loading table 25 which is mounted between the side frame members 1 and 2 for upward and downward sliding movement. A lost motion connection is provided between the table 25 and the slide 17 by making the suspension rods 24 slidable within slide 17 to a degree which is limited by nuts 26 engaging the top of slide 17. The lower ends of rods 24 are secured to table 25 by nuts 27 and 28. The loading table 25 is not held rigidly in horizontal position by rods 24 but is mounted tiltably with respect to the vertical axis of form 9. Tilting movement of the loading table is achieved by locating the nuts 27 and 28 at a distance from each other slightly greater than the thickness of loading table 25, by loose fit of suspension rods 24 in slide 17 or by a combination of the two.

It will be seen that as slide 17 starts downward, the table 25 will move with it until this table rests upon the top of form 9, whereupon its downward movement will be arrested. When a form having a beveled upper edge is used, the small amount of play provided by the loose fit of nuts 27 and 28, or by the loose fit of rods 24 in slide 17, will permit table 25 to tilt until it rests firmly upon the upper end of the form. After table 25 comes in contact with the upper end of form 9, the slide 17 and its pendent packer heads 20 may continue downward movement until these packer heads extend not only through the openings in pallet 11, but also downward through stand 8 and through the opening 29 in support table 7, as illustrated in FIG. 5. When the loading table 25 is at rest on the top of form 9, the table 25 serves as a top wall of the form and has appropriate openings to permit passage therethrough of packer heads 20, as well as the smaller pin openings 30, to permit passage of dowel pin hole forming pins. The loading table 25 also has an upstanding flange 31 on its upper surface providing a shallow hopper adapted to receive cement slurry or mix from a bleeding mechanism 32.

Any suitable means may be provided for raising and lowering the slide 17. The means illustrated is a pair of hydraulic cylinders 33, having pistons therein actuating piston rods 34, the upper ends of which are secured to laterally extending elements 35 of slide 17.

In the machine described in my co-pending application, dowel pin holes have been formed in the lower part of the conduit by pins 36 moved upward through the openings corresponding to openings 12 in pallet 11. In the present device, the pins 36 being in axial alignment with auxiliary push rods 37 which carry dowel hole forming pins 38 at their upper ends actuate the auxiliary push rods as pins 36 move upward so that the dowel hole forming pins 38 pass through openings 12 in pallet 11 into the form 9.

Directly beneath that portion of table 7, which carries the stand 8, a pit or other space 39 is provided. In pit 39 are mounted pins 36 movable upward to contact rods 37 and carry pins 38 into form 9 through holes 12, and downward to a position below table 7. An exemplary structure includes suitable guides, such as upright guideposts 40. On guidepost 40 is a slide or crossbar 41 carrying the pins 36 extending upwardly therefrom and held in alignment with auxiliary push rods 37 by means of openings in a crossbar 42 on guideposts 40. The cross head 41 may have its weight partially counter-balanced by suitable springs 43 extending upward and engaging the crossbar 42 on the post 40. The cross head 41 may be moved upward and the upper ends of the pins 36 encounter auxiliary push rods 37 and move these rods upward until the dowel hole forming pins 38 enter the form 9 for a desired distance through openings 12 and pallet 11. A conduit section formed in the form 9 while the dowel hole forming pins 38 are in this position thus will be formed with dowel pin holes 44 in its lower ends of dimension suitable to receive at least one-half the length of dowel pins 44a shown in FIG. 2.

The cross head 41 is provided with lugs 45 adjacent its opposite ends to which are secured duplicate operating mechanisms. Each has a rod 46 (FIG. 4) extending upward from the lug. The upper end of 46 is pivotally connected at 47 to one end of a lever 48 whose fulcrum is at 49. Adjacent to the same end of lever 48 there is pivoted thereto at 51 a second rod 52 which at its upper end is connected to a second actuating lever 53 by a pivoted connection 54. The lever 53 has its fulcrum at 55 and has its end opposite pivot 54 disposed to be engaged by the lower portion of slide 17, as this slide nears the lower extremity of its travel, as shown in dotted lines. After slide 17 engages the lever 53 it will swing the lever 48 from position shown in solid lines to the position shown in dotted lines in FIG. 4. This operation will pull the rod 52 upward and swing the lever 48 into the position shown in dotted lines. This, in turn, moves the rod 46 upward to carry the cross head 41 and pins 36 into raised position. As pins 36 raise, they encounter the auxiliary push rods 37 and carry the dowel hole forming pins 38 through openings 12 into form 9 for distance required to form a dowel hole of selected depth determined by travel of rod 46 between its upper and lower positions.

In order to hold the pins 36 in their upper position during the filling of the form, one or more forked levers 55 are provided, each straddling the cross head 41 and mounted on a fixed pivot 56. A spring 57 is secured to the lever 55 and extends to an anchor 58 located to extend the spring 57 across or adjacent to the axis of the pivot 56 when the lever 55 and cross head 41 are in their lowest positions. Thus the spring 57 will have little effect on the cross head 41 when it is in the lower position, but when the cross head is moved up the spring 57 will strongly urge the lower arm of the forked lever 55 against the lower side of cross head 41 to hold it up with pins 38 in the form. Thus the lever 55 and spring 57 will serve as a detent opposing movement of the pins 38 from their position extending into form 9.

Opposite the fulcrum 49 from pivots 47 and 51, the lever 48 is pivotally connected to a pull rod 59 extending upward through an arm 61 on slide 17. A nut 62 above the arm 61 engages the rod 59 and serves to limit the upper movement of arm 61 with respect to rod 59. When the pins 38 are up and the parts 46 and 48 are in their position, shown in dotted lines in FIG. 4, the arm 61 will engage the nut 62 as the slide 17 moves upward and will move the rod 49 upward to restore these parts to their positions shown in solid lines. This will also move the levers 48 and 53 and the lug 45 and cross head 41 to their solid line positions, thereby permitting springs 63 to withdraw pins 38 from the mold and further retracting pins 36 to a position below table 7 so that the mold and stand may be removed and replaced with a stand carrying an empty mold. The dowel holes in the upper end of the conduit are provided by dowel hole forming pins 65. These pins are carried on a cross head 66 suspended by suspension rods 67 from slide 17. These rods pass through the slide 17 and have nuts 68 on their upper ends limiting the upward movement of the slide 17 with respect to the rods. These rods are secured to a cross head by means of nuts 69. When the slide 17 is in its upper position, the cross head 66 will be suspended, as shown in FIG. 1, and the pins 65 will be held with their upper ends in or above the upper surface of table 25 and above the upper end of form 9. Thus, all dowel hole forming pins are withdrawn before the form ends are removed and not afterwards, so there is no breakage or shattering of the concrete conduit section as the dowel hole forming pins are withdrawn.

The cross head 66 is provided with laterally extending ears or extensions 71, which engage the top of the support element 6 and so suspend their limit in the cross head 66 in its lower position. In this position, it will be seen that the pins 65 extend downward through openings 30 in table 25 and into the interior of form 9 so as to provide dowel holes in the upper end of a conduit section formed in such form when the pins are in place. The rods 67 being slidable through slide 17 merely stop moving downward when the projections 71 engage the support 6 to arrest movement of cross head 69 and of the pins 65, but the slide 17 is permitted to continue its downward movement thereafter.

Figure 8:
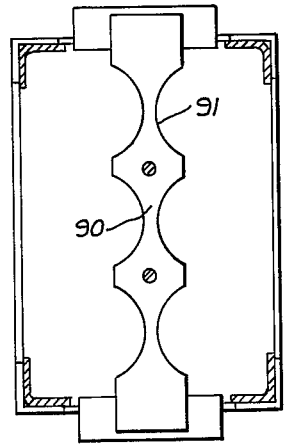
FIG. 8 is a cross sectional view of the stand of FIG. 6 taken on the line 8—8.

In operation the stand is placed upon form 7 in the location normally occupied by a form of selected standard length and the short form 9 is placed upon the top of the stand. The various parts of the machine occupy the positions illustrated in FIG. 1 except that, at this stage, the form 9 is empty, but has the bottom plate or pallet 11 in place therein. The hydraulic cylinder mechanism, comprising cylinders 33 and piston rods 35, is then operated to start the slide 17 to moving downward. The downward movement carries the packer heads 20 downward through the loading table 25, form 9 downward through the stand 8 to the extreme position shown in FIG. 5 where the heads are shown in the opening 29 in support 7. The packer heads are permitted to pass downward through stand 9 since cross bars 90 bracing the stand have semicircular cutout portions 91 permitting passage of the packer heads. These are best shown in FIG. 8.

As the slide 17 moves downward the cross head 66 carrying pins 65 moves downward with it until the ears 71 come in contact with the top of support 6 and stops the downward movement of the cross head 66. The point at which this downward movement stops is illustrated in FIG. 5 with the lower ends of pins 65 extending into the form 9 far enough to provide the necessary depth for dowel holes in the upper end of the form. Thereafter downward movement of the slide 17 does not change the position of the cross head 66 or of pins 65. The initial downward movement of the slide movement likewise produces downward movement of loading table 25 until this table rests on top of form 9 which arrests its downward movement. It should be noted that this downward movement is arrested after only a short distance and since the rods 24 are slidable in slide 17, the slide 17 may continue its movement after the movement of loading table 25 is arrested. The downward movement of cross head 66 is not arrested by engagement of the ears 71 with the support 6 until substantially later than the arrest of downward movement of the loading table 25, so that the pins 65 continue their downward movement until they project through openings 30 into form 9.

During the same downward movement of slide 17 the lower pins 36 remain in their lowermost position until the slide 17 engages the lever 53 and as the downward movement of slide 17 continues, the lever 53 moves from the position shown in solid lines in FIG. 4 to the position shown in dotted lines, the dotted line position being reached just as the lowermost point of travel of slide 17 is attained. As described above, this movement of the lever 53 causes upward movement of rod 52, the cross head 41 and pins 36. The pins 36 contact and move auxiliary push rods 37 upward carrying the lower dowel hole forming pins 38 through openings 12 in pallet 11 to form dowel pin openings 44 in the lower part of the conduit section.

The detent comprising the forked lever 55 and spring 58 holds the cross head 41 in arrested position while the slide 17 begins its upward travel. As the packer heads 20 enter the bottom of form 9 they are rotated and the feeder mechanism 32 is operated to feed cement mix into the hopper formed by the flange 31 on table 25 and this mix is pushed in through the openings in table 25 through which the packer heads moved in their downward movement. As this material flows on and around the packer heads, it is packed in place. And as soon as the lower end of the form becomes fully packed with cement mix, the slide 17 is started on a relatively slow upward movement while rotation of the packer heads 20 continues and cement mix is fed into the form. During this upward movement, the pins 38 remain in their position projecting into the lower end of form 9 and pins 65 remain in their position projecting into the upper end of the form until the point is reached at which the arm 61 engages the nuts 62 and draws rod 59 upward. It should be noted that this will occur before the table 25 which forms the top of the mold 9 is lifted from its position on the mold. Thereupon further upward movement of slide 17 acts through rods 59, the lever 48, the rods 46 and arm 45 to lower the cross head 41 and pins 36. Springs 63 then retract pins 38 from their position in the mold. The cross head 41 and pins 36 are retracted to a position below that of the supporting table 7.

The operation just described requires that the slide 17 and packer heads 20 move through the full distance required for forming a conduit section of standard length, thus requiring the same time for forming a short section as for a standard section. If it is desired to speed up the formation of short sections, means may be provided for arresting downward travel of slide 17 and packer heads 20 when lower parts of the packer heads are in the openings 20d (FIG. 5) in pallet 11, such as a switch or other valve control (not shown) adjustable to a position to be actuated by downward movement of slide 17 when the packer heads are in openings 20d and effective to apply fluid pressure to cylinders 33 effective to stop downward movement of the slide. The operation is otherwise the same as that described above.

Figure 11:
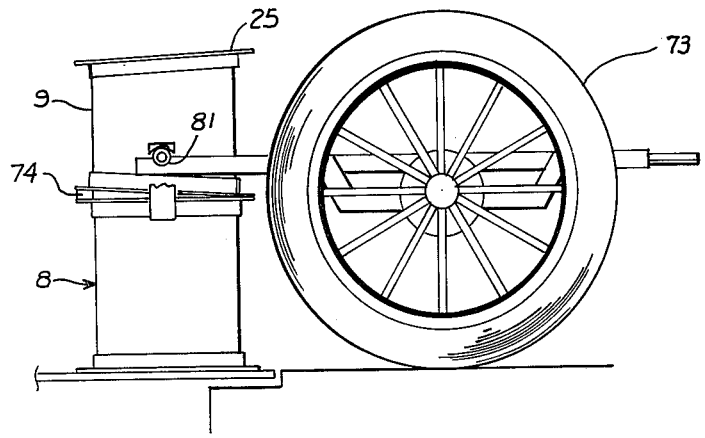
FIG. 10 is a detail of a propping member used to secure vertical disposal of a form having beveled ends and FIG. 11 is a fragmentary view showing cooperation between the stand, a form for forming short, beveled blocks, the propping member of FIG. 10, a lifting member on the stand and a wheeled device for placing the stand and form on and removing them from the supporting member of the machine.

Thus it will be seen that the pins 38 and 65 will be extracted from the section of conduit formed in mold 9 while the feed table 25 and pallet are in positions to serve as end walls of the form, thereby preventing any breaking away of cement material by the removal of these pins. It will also be seen that the pins will be removed substantially as the slinger portions 20a at the upper ends of the packer heads 20 emerge from the upper end of form 9 so that the dowel pin holes will not be closed by action of the slingers after removal of pins 65. The only action on the interior of the ducts through the conduit after removal of pins 65 will be the troweling actions of the packer heads which does not tend to further pack the cement mix but merely to smooth the walls of the ducts in the conduit section. After complete removal of the packer heads 20 has taken place, the nuts 26 carried by suspension rods 24 will engage the upper side of slide 17 and the suspension rods will be carried upward, thus lifting table 25 from the top of form 9. All parts will then be positioned such that the stand 8 and filled form 9 may be moved by rotation of table 7 on its pivot to a point where the stand and mold can be picked up by a suitable carrier designated generally as 73 in FIG. 11 and be removed to a curing area where the form may be taken off the conduit section while the conduit section is still on the stand, the conduit section and pallet are removed from the stand, and the stand and form are assembled for re-use.

Figure 10:
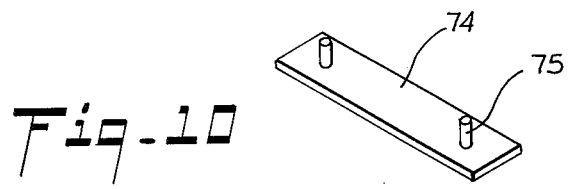
Figure 9:
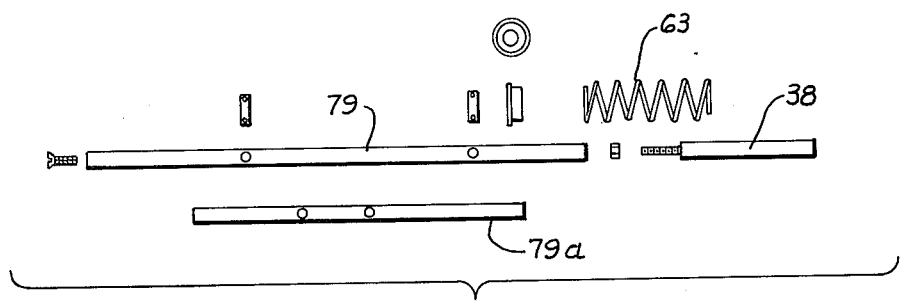
FIG. 9 is an exploded view of the dowel hole forming members in the stand of FIG. 6.

When short sections having beveled ends are to be formed, the form used has ends beveled according to the angle desired. The angle is usually quite small, 1½° being most commonly used. In assembling a form of this type on the stand 8, a propping bar 74, shown in FIG. 10, preferably having dowels 75 fitting into opening 76 (FIG. 7) in the top of the stand, is used. The thickness of the propping bar 74 is chosen so that the form is supported with its sides in vertical position on the stand. The operation is substantially the same as that described above except that the loading table 25 comes to rest at an angle on the top of the angled form. This arrangement is permitted by the play between nuts 28 and 27 on rods 24 and the corresponding surface of loading table 25 or loose fit of rods 24 in slide 17 or a combination of the two.

It is preferred that the stand 8 be made adjustable by providing a number of positions such as are indicated by bolt holes 77 and 78. While only two positions are shown for adjusting the height of stand 8, it is to be understood that as many positions as may be desired may be provided.

It will be seen that it is necessary to provide a similar adjustment in the length of auxiliary push rods 37 and this is preferably done by providing sections 79, 79a, etc. of various lengths which may be interchanged at will, each of the lengths corresponding to a position such as that illustrated as 77 and 78 in adjustment of the height of the stands.

The use of short forms carried on a stand presents the problem of raising the center of gravity to a point where the assembly of filled form and stand would be top heavy and difficult to handle by the type of wheeled fork carrier 73 ordinarily used for handling filled sections of standard length. This difficulty is avoided by providing a carrier engaging member 81 attached to the stand and extending upward along the outside of form 9 to a level above the center of gravity of the filled form and stand so that the same carrier used with standard height forms may be used, and all operations are then carried out in substantially the same manner as when forms of standard length are used.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a conduit-forming machine of the type having a frame, a form support adjacent a lower part of the frame, a form of selected standard length supported vertically by said support, said form having ends with aligned openings therein in positions registering with the ends of a duct to be formed in a conduit in said form, a packer head, a packer head supporting and driving shaft carrying said packer head, means on the frame above said form for rotatably and vertically movably mounting said shaft on the frame in axial alignment with said openings, said vertically movable mounting means providing limits for vertical movement of said shaft great enough to permit movement of the packer head through said form from one end to the other and out of said form through an opening in a lower end of said form, driving means including means for rotating said shaft and head, and means for simultaneously vertically moving said shaft to move the packer head longitudinally through and out of the lower end of said form, opposed dowel hole-forming pins, guide means on the frame spaced from and opposed to the opposite ends of said form and slidably supporting the pins with their axes parallel to the axis of said shaft for axial sliding movement into and out of said form through the opposite ends thereof respectively between positions extending into said form through said respective ends and outside of and clear of said form; means, operatively connected to said pins, for moving said pins between said position extending into said form and said position outside said form, and means for feeding cement mix into said form while the packer head is in an opening in the bottom of the form and during upward movement of the packer head, that improvement which comprises a form of shorter length than said selected standard length, said shorter form having ends with aligned openings therein registering with the ends of a duct to be formed, a stand of length complementary to the length of the form of shorter length to provide said selected standard length carried by the support and carrying said form of shorter length; said stand having an opening therein permitting passage of said packer head; a reciprocable auxiliary push rod in the stand axially aligned with one of said pins, in position to be contacted by and moved by said pin on movement of the pin toward the form; an auxiliary dowel hole-forming pin carried by said auxiliary push rod in axial alignment therewith on an end of the auxiliary push rod opposite said first-mentioned pin movable into dowel hole-forming position in said shorter form and to a position outside said shorter form by reciprocation of the auxiliary push rod; and means in the stand for retracting the auxiliary push rod downward on retraction of the first-mentioned pin.

2. The machine of claim 1 in which the stand is adjustable to a plurality of selected heights, the auxiliary push rod has interchangeable sections of length to correspond to any selected height of the stand, and the means in the stand for moving the auxiliary push rods downward is a resilient member stressed by movement of the auxiliary push rod into dowel hole-forming position.

3. The machine of claim 1 having a vertically movable member forming an upper end of the form, said vertically movable member having openings registering with the ends of a duct to be formed in the form, and the shorter form is carried on the top of the stand with its sides vertical.

4. The machine of claim 3 in which the vertically movable member is tiltable, and the short form has opposite ends beveled on planes extending radially outward from a common center.

5. The apparatus of claim 4 wherein the stand includes a removable propping member adapted to maintain the sides of a short beveled form in vertical position when the removable member is on the stand, and the stand includes a lifting member extending upward along the side of the form to a position above the center of gravity of the filled form and stand.

References Cited by the Examiner
UNITED STATES PATENTS

| | | | |
|---|---|---|---|
| 3,091,831 | 6/1963 | Rauch | 25—36 |
| 3,095,628 | 7/1963 | Norton et al. | 25—36 |

J. SPENCER OVERHOLSER, *Primary Examiner.*